United States Patent [19]
Weder et al.

[11] Patent Number: 5,572,849
[45] Date of Patent: Nov. 12, 1996

[54] METHOD OF PACKAGING A POTTED PLANT

[75] Inventors: Donald E. Weder; Joseph G. Straeter, both of Highland; William F. Straeter, Breese, all of Ill.

[73] Assignee: Southpac Trust International, Inc., Oklahoma City, Okla.

[21] Appl. No.: 457,186

[22] Filed: Jun. 1, 1995

Related U.S. Application Data

[63] Continuation of Ser. No. 386,859, Feb. 10, 1995, Pat. No. 5,493,809, which is a continuation-in-part of Ser. No. 237,078, May 3, 1994, Ser. No. 313,675, Sep. 27, 1994, abandoned, and Ser. No. 218,952, Mar. 25, 1994, which is a continuation-in-part of Ser. No. 95,331, Jul. 21, 1993, Pat. No. 5,428,939, said Ser. No. 237,078, is a continuation-in-part of Ser. No. 220,852, Mar. 31, 1994, and Ser. No. 940,930, Sep. 4, 1992, Pat. No. 5,361,482, said Ser. No. 313,675, is a continuation of Ser. No. 188,183, Jan. 28, 1994, Pat. No. 5,388,386, which is a continuation of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned.

[51] Int. Cl.⁶ .......................... B65B 11/02; B65B 25/02; B65B 51/00
[52] U.S. Cl. ................ 53/397; 53/390; 53/416; 53/461
[58] Field of Search .................. 53/399, 397, 461, 53/416, 417, 419, 468, 465, 219, 218, 390; 206/423

[56] References Cited

U.S. PATENT DOCUMENTS

| Re. 21,065 | 5/1939 | Copeman ................... 93/2 |
| D. 335,105 | 4/1993 | Ottenwalder et al. ......... D11/164 |
| 524,219 | 8/1894 | Schmidt . |
| 732,889 | 7/1903 | Paver . |
| 950,785 | 3/1910 | Pene . |

(List continued on next page.)

FOREIGN PATENT DOCUMENTS

| 2489126 | 3/1982 | France . |
| 513971 | 11/1930 | Germany ................... 47/72 |
| 542958 | 2/1993 | Japan . |
| 560532 | 4/1975 | Switzerland ............ 206/423 |

OTHER PUBLICATIONS

Exhibit A—Speed Cover Brochure, "The Simple Solution For Those Peak Volume Periods", Highland Supply Corporation, ©1989.
Exhibit B—"Speed Sheets and Speed Rolls" Brochure, Highland Supply Corporation, ©1990.
Exhibit C—"Color Them Happy with Highlander Products" ©1992.
Exhibit D—"Costa Keeps the Christmas Spirit", Supermarket Floral, Sep. 15, 1992.
Exhibit E—"Super Seller", Supermarket Floral, Sep. 15, 1992.
Exhibit F—"Halloween", Link Magazine, Sep. 1992, 2 pages.
Exhibit G—"Now More Than Ever", Supermarket Floral, Sep. 15, 1992.
Exhibit H—Le Plant Sac Advertisement, published prior to Sep. 26, 1987.
Exhibit I—"A World of Cut Flower and Pot Plant Packaging" Brochure, Klerk's Plastic Products Manufacturing, Inc., Date unknown, 6 pages.
Exhibit J—Chantler & Chantler brochure showing Zipper Sleeve™ and Florasheet®, Date unknown, 2 pages.
Exhibit K—Photograph of Zipper Sleeve.

Primary Examiner—James F. Coan
Attorney, Agent, or Firm—Dunlap & Codding, P.C.

[57] ABSTRACT

A sleeve used to wrap items such as potted plants. The sleeve may have an open or closed bottom. When closed, the bottom may have a gusset for allowing expansion upon the depositing of the pot into the sleeve. The sleeve has a detachable upper portion. The sleeve may have a bonding material disposed upon an inner or outer portion of the sleeve for attaching the sleeve to the pot or item.

26 Claims, 9 Drawing Sheets

OTHER PUBLICATIONS

| | | |
|---|---|---|
| 1,063,154 | 5/1913 | Bergen . |
| 1,446,563 | 2/1923 | Hughes .............................. 206/423 X |
| 1,525,015 | 2/1925 | Weeks . |
| 1,610,652 | 12/1926 | Bouchard . |
| 1,697,751 | 1/1929 | Blake ................................... 229/87 |
| 1,863,216 | 6/1932 | Wordingham . |
| 1,978,631 | 10/1934 | Herrlinger ............................... 91/68 |
| 2,048,123 | 7/1936 | Howard .................................. 229/87 |
| 2,170,147 | 8/1939 | Lane ..................................... 206/56 |
| 2,278,673 | 4/1942 | Savada et al. ........................ 154/43 |
| 2,302,259 | 11/1942 | Rothfuss ................................. 41/10 |
| 2,355,559 | 8/1944 | Renner ................................... 229/8 |
| 2,371,985 | 3/1945 | Freiberg ................................ 206/46 |
| 2,411,328 | 11/1946 | MacNab .................................. 33/12 |
| 2,510,120 | 6/1950 | Leander ................................ 117/122 |
| 2,529,060 | 11/1950 | Trillich ................................ 117/68.5 |
| 2,621,142 | 12/1952 | Wetherell ............................. 154/117 |
| 2,648,487 | 8/1953 | Linda .................................... 229/55 |
| 2,774,187 | 12/1956 | Smithers ................................ 47/41 |
| 2,822,287 | 2/1958 | Avery ................................... 117/14 |
| 2,846,060 | 8/1958 | Yount .................................... 206/58 |
| 2,850,842 | 9/1958 | Eubank, Jr. ............................. 47/58 |
| 2,883,262 | 4/1959 | Borin .................................... 21/56 |
| 2,989,828 | 6/1961 | Warp ................................... 53/390 |
| 3,022,605 | 2/1962 | Reynols ................................. 47/58 |
| 3,094,810 | 6/1963 | Kalpin .................................. 47/37 |
| 3,121,647 | 2/1964 | Harris et al. .......................... 118/202 |
| 3,130,113 | 4/1964 | Silman ................................. 161/97 |
| 3,271,922 | 9/1966 | Wallerstein et al. ..................... 53/3 |
| 3,376,666 | 4/1968 | Leonard ................................. 47/41 |
| 3,380,646 | 4/1968 | Doyen et al. ........................... 229/57 |
| 3,431,706 | 3/1969 | Stuck .................................. 53/390 |
| 3,508,372 | 4/1970 | Wallerstein et al. ..................... 53/3 |
| 3,552,059 | 1/1971 | Moore ............................... 47/41.12 |
| 3,554,434 | 1/1971 | Anderson .............................. 229/55 |
| 3,556,389 | 1/1971 | Gregoire ............................... 229/53 |
| 3,557,516 | 1/1971 | Brandt ................................... 53/14 |
| 3,620,366 | 11/1971 | Parkinson ............................... 206/59 |
| 3,681,105 | 8/1972 | Milutin ................................. 117/15 |
| 3,793,799 | 2/1974 | Howe ..................................... 53/32 |
| 3,869,828 | 3/1975 | Matsumoto ........................... 47/34.11 |
| 4,043,077 | 8/1977 | Stonehocker ............................. 47/66 |
| 4,054,697 | 10/1977 | Reed et al. ............................ 428/40 |
| 4,091,925 | 5/1978 | Griffo et al. ......................... 206/423 |
| 4,118,890 | 10/1978 | Shore .................................... 47/28 |
| 4,189,868 | 2/1980 | Tymchuck et al. ........................ 47/84 |
| 4,216,620 | 8/1980 | Weder et al. ........................... 47/72 |
| 4,280,314 | 7/1981 | Stuck .................................. 53/241 |
| 4,297,811 | 11/1981 | Weder ................................... 47/72 |
| 4,333,267 | 6/1982 | Witte .................................... 47/84 |
| 4,380,564 | 4/1983 | Cancio et al. ......................... 428/167 |
| 4,400,910 | 8/1983 | Koudstaal et al. ........................ 47/84 |
| 4,413,725 | 11/1983 | Bruno et al. ....................... 206/45.33 |
| 4,546,875 | 10/1985 | Zweber ................................ 206/0.82 |
| 4,640,079 | 2/1987 | Stuck .................................. 53/390 |
| 4,733,521 | 3/1988 | Weder et al. .......................... 53/580 |
| 4,765,464 | 8/1988 | Ristvedt ............................... 206/0.82 |
| 4,771,573 | 9/1988 | Stengel ................................. 47/67 |
| 4,773,182 | 9/1988 | Weder et al. ........................... 47/72 |
| 4,801,014 | 1/1989 | Meadows ............................... 206/423 |
| 4,835,834 | 6/1989 | Weder .................................. 29/525 |
| 4,941,572 | 7/1990 | Harris ................................. 206/423 |
| 4,980,209 | 12/1990 | Hill .................................. 428/34.1 |
| 5,073,161 | 12/1991 | Weder et al. .......................... 493/154 |
| 5,105,599 | 4/1992 | Weder .................................. 53/399 |
| 5,111,638 | 5/1992 | Weder .................................. 53/397 |
| 5,120,382 | 6/1992 | Weder .................................. 156/212 |
| 5,152,100 | 10/1992 | Weder et al. ........................... 47/72 |
| 5,181,364 | 1/1993 | Weder .................................. 53/397 |
| 5,199,242 | 4/1993 | Weder et al. ........................... 53/397 |
| 5,205,108 | 4/1993 | Weder et al. ........................... 53/397 |
| 5,228,234 | 7/1993 | de Klerk et al. ..................... 47/41.01 |
| 5,235,782 | 8/1993 | Landau ................................. 47/72 |
| 5,259,106 | 11/1993 | Weder et al. ........................ 29/469.5 |

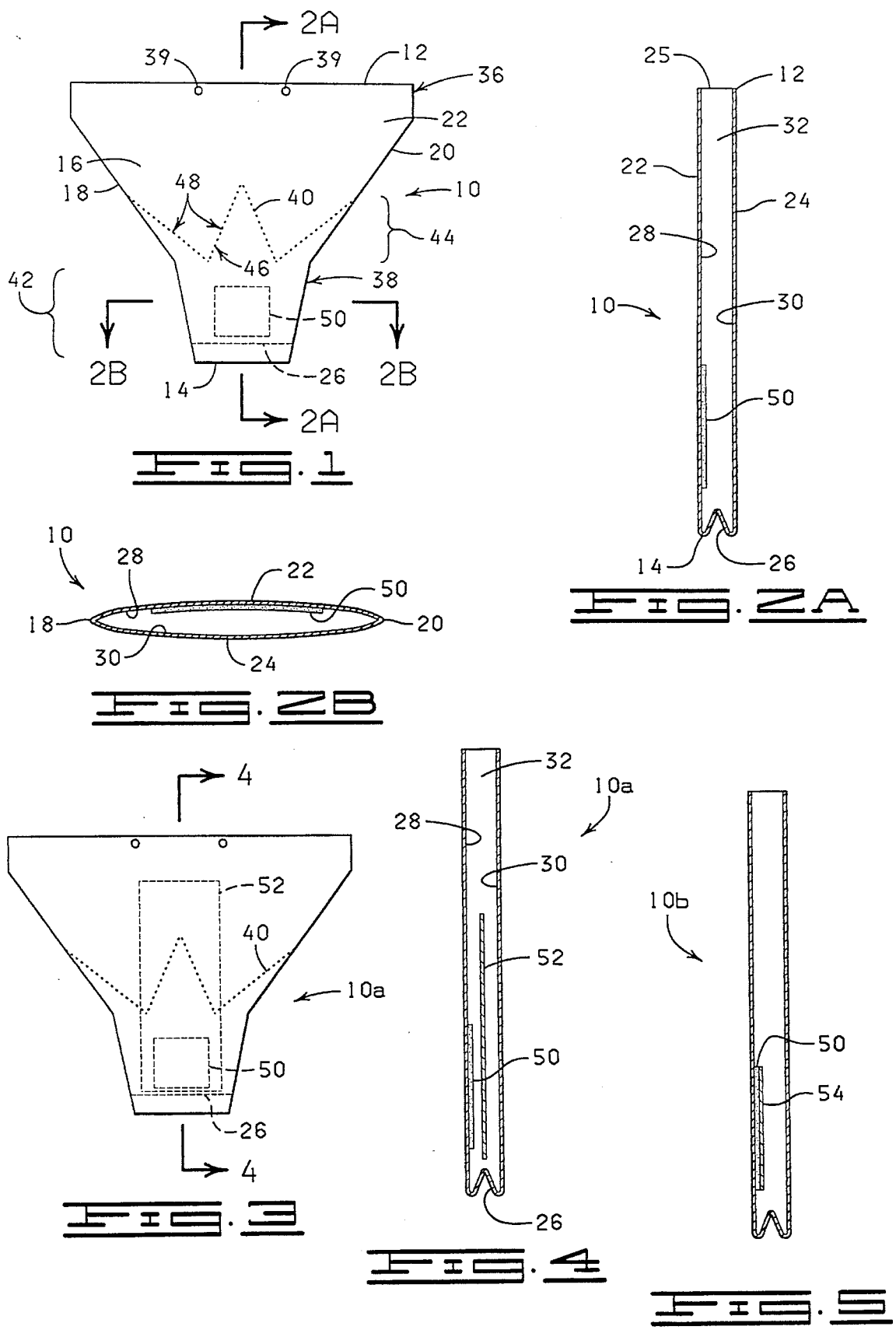

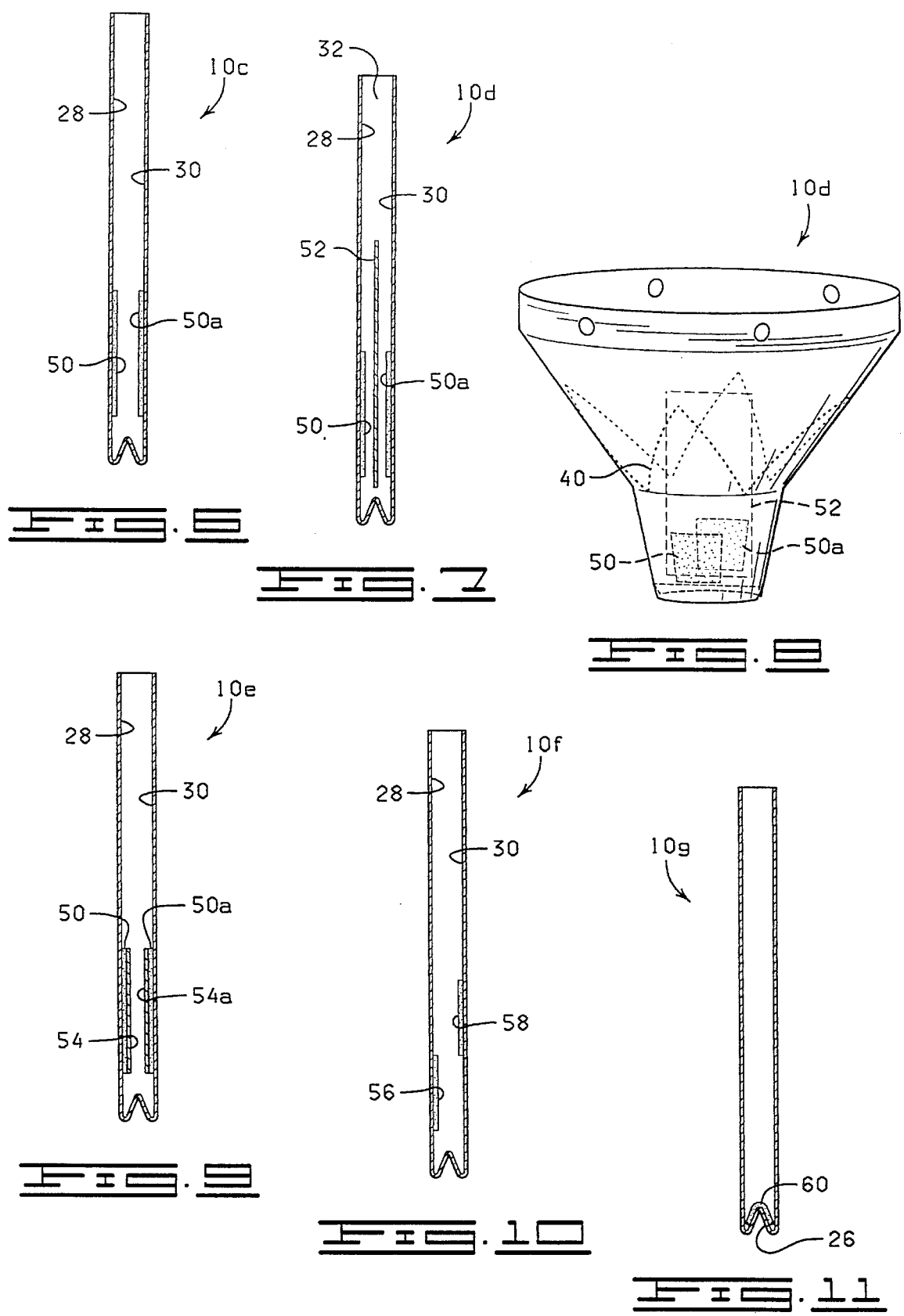

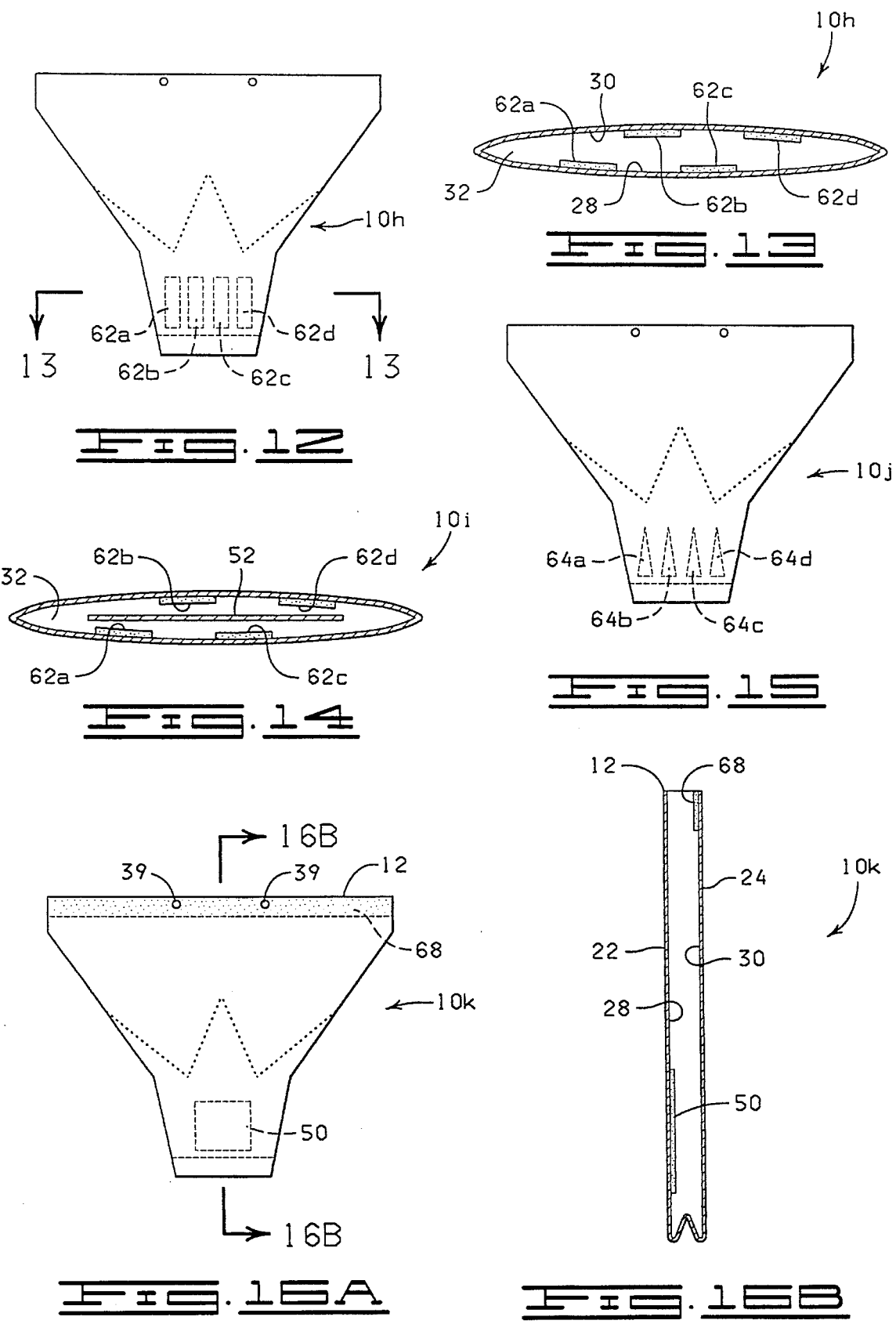

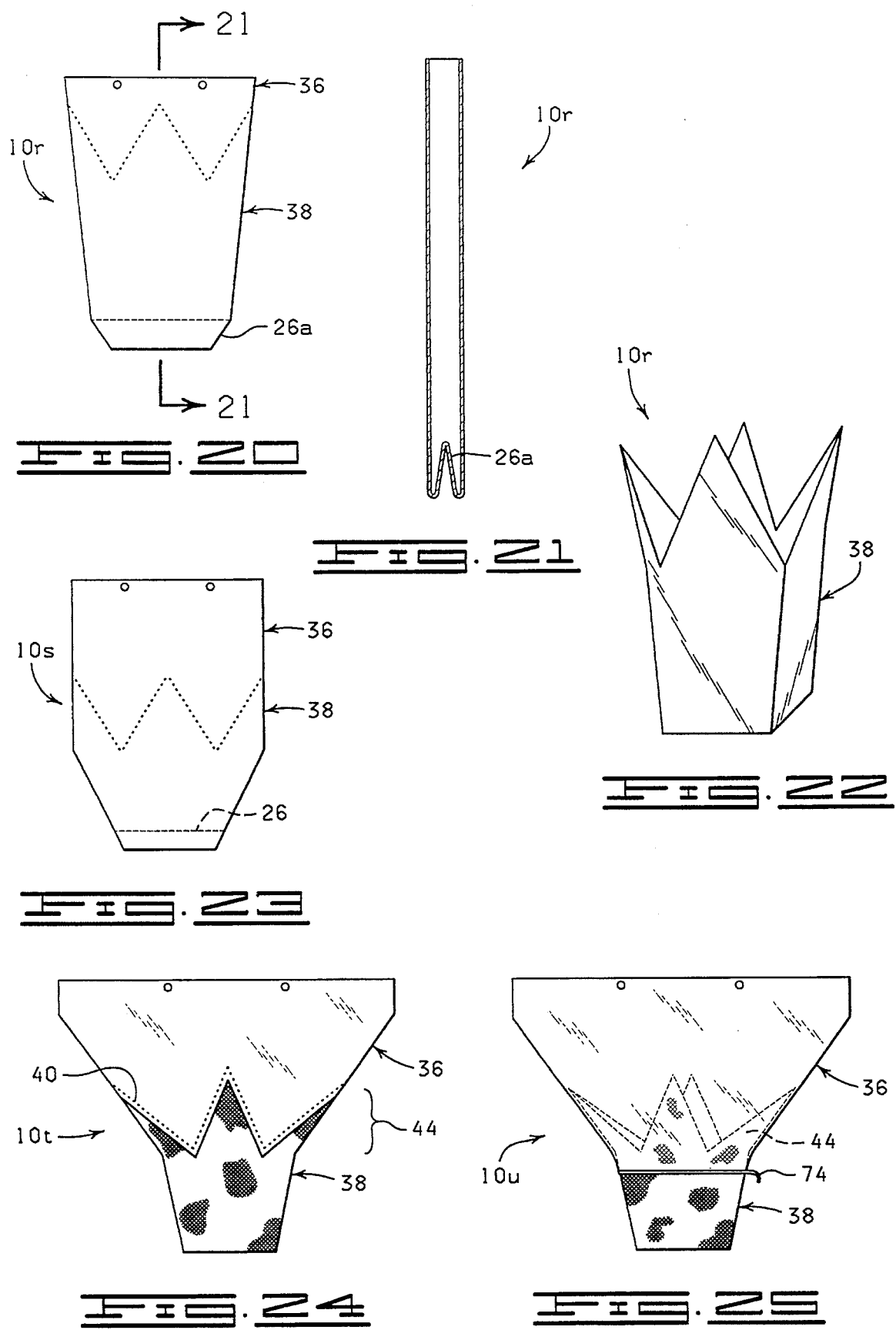

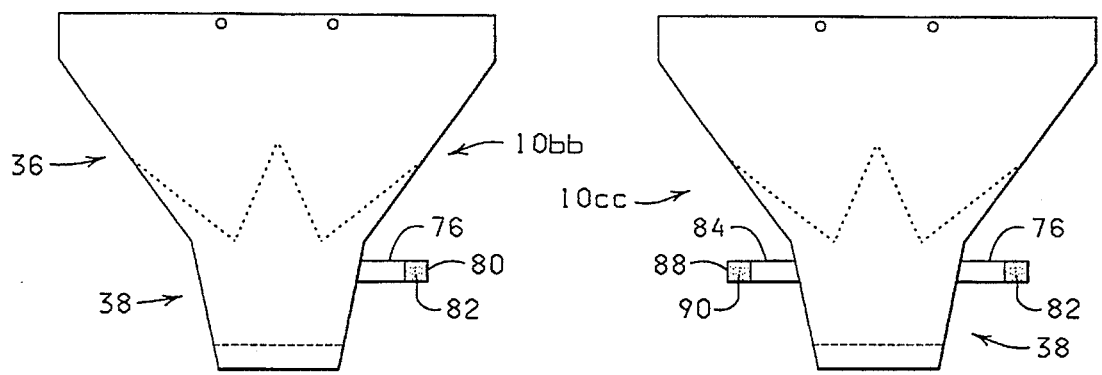
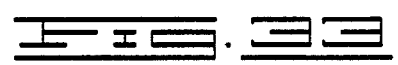
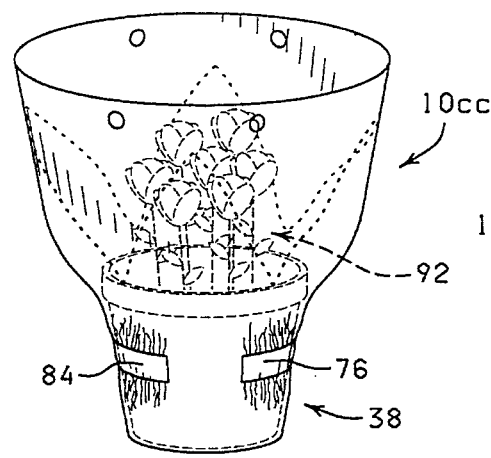
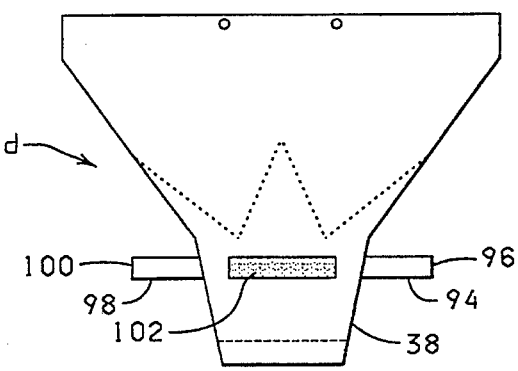
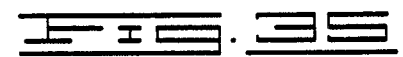
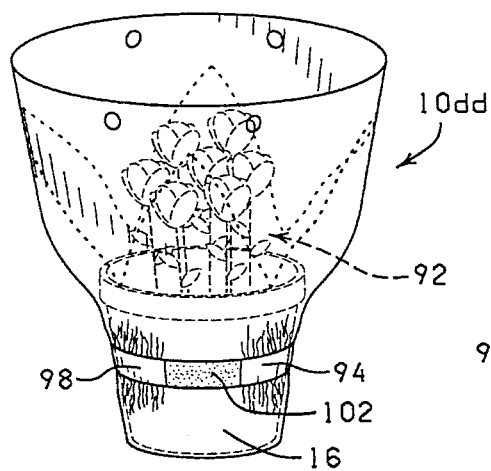
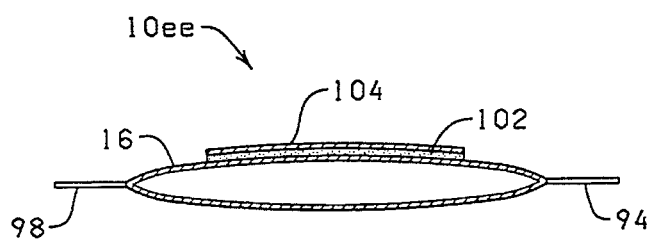
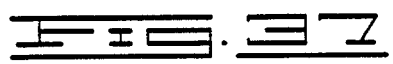
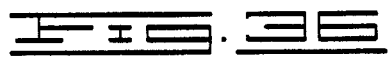

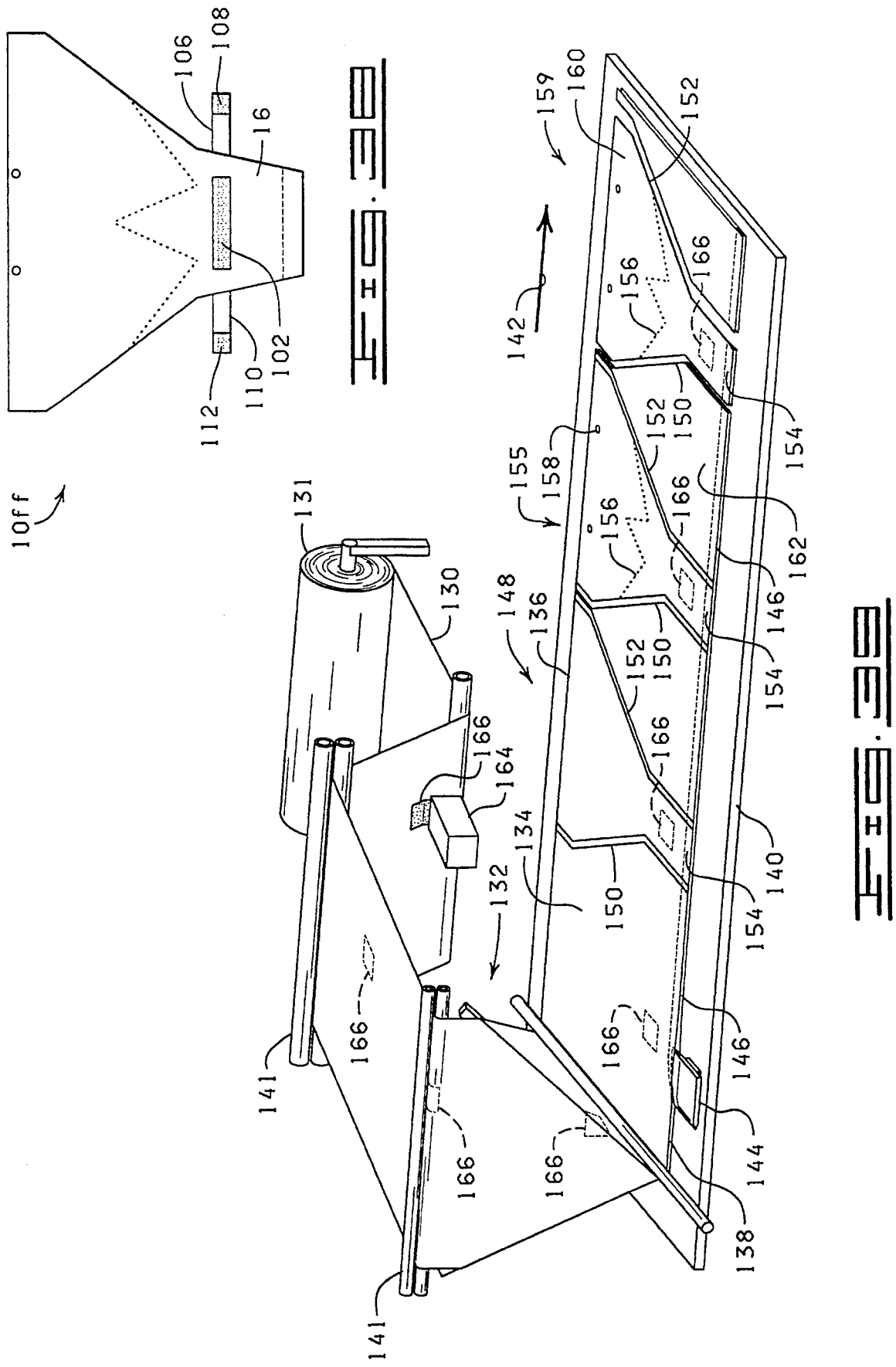

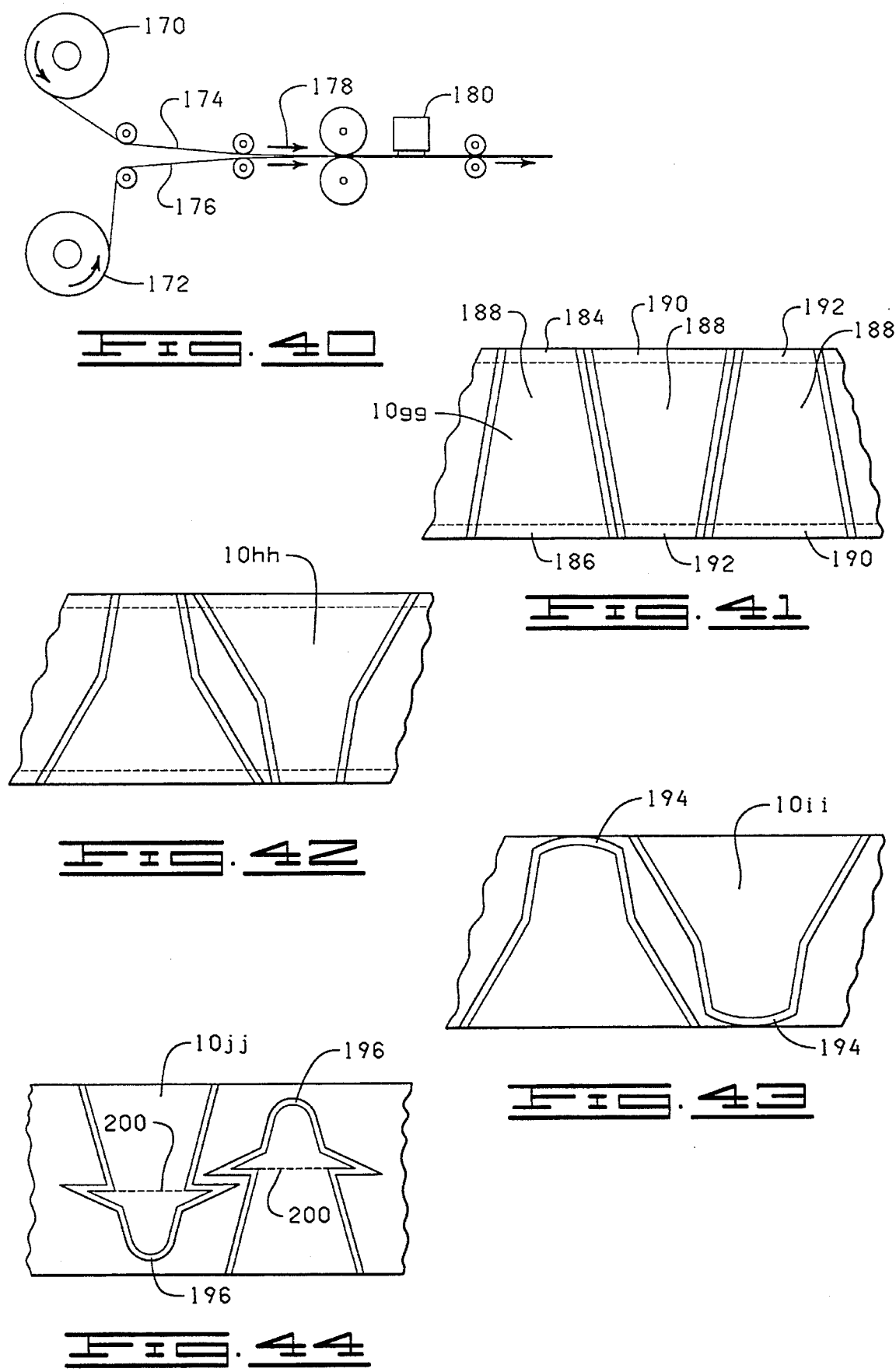

5,572,849

METHOD OF PACKAGING A POTTED PLANT

CROSS REFERENCE TO RELATED APPLICATIONS

The present application is a continuation of U.S. Ser. No. 08/386,859 filed Feb. 10, 1995 now U.S. Pat. No. 5,493,809 which is a continuation-in-part of U.S. Ser. No. 08/237,078, filed May 3, 1994, entitled "SLEEVE HAVING A DETACHABLE PORTION FOR FORMING A SKIRT AND METHODS", which is a continuation-in-part of U.S. Ser. No. 08/220,852, filed Mar. 31, 1994, entitled "PLANT PACKAGE HAVING A DETACHABLE SLEEVE AND METHODS".

The said application, Ser. No. 08/237,078 is also a continuation-in-part of U.S. Ser. No. 07/940,930, filed Sep. 4, 1992, entitled "A METHOD OF FORMING A FLOWER POT COVER WITH CRIMPED PORTION", issued Nov. 8, 1994, now U.S. Pat. No. 5,361,482.

Ser. No. 386,859 is also a continuation-in-part of U.S. Ser. No. 08/313,675, filed Sep. 27, 1994, entitled "METHOD FOR WRAPPING AN OBJECT WITH AN EMBOSSED MATERIAL", now abandoned, which is a continuation of U.S. Ser. No. 08/188,183, filed Jan. 28, 1994, entitled "METHOD FOR WRAPPING AN OBJECT WITH AN EMBOSSED MATERIAL HAVING AN ADHESIVE THEREON", now U.S. Pat. No. 5,388,386, which is a continuation of U.S. Ser. No. 07/968,798, filed Oct. 30, 1992, entitled "METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL", now U.S. Pat. No. 5,369,934, issued Dec. 6, 1994, which is a continuation of U.S. Ser. No. 07/865,563, filed Apr. 9, 1992, entitled "METHODS FOR WRAPPING A FLORAL GROUPING", now U.S. Pat. No. 5,245,814, issued Sep. 21, 1993, which is a continuation of U.S. Ser. No. 07/649,379, filed on Jan. 31, 1991, entitled "METHOD FOR WRAPPING AN OBJECT WITH A MATERIAL HAVING PRESSURE SENSITIVE ADHESIVE THEREON", now U.S. Pat. No. 5,111,638, issued May 12, 1992, which is a continuation of Ser. No. 07/249,761, filed Sep. 26, 1988, entitled "METHOD FOR WRAPPING AN OBJECT WITH A MATERIAL PRESSURE SENSITIVE ADHESIVE THEREON", now abandoned.

Ser. No. 836,859 is also a continuation-in-part of U.S. Ser. No. 08/218,952, filed Mar. 25, 1994, entitled "FLORAL GROUPING HAVING A DETACHABLE PORTION", which is a continuation-in-part of U.S. Ser. No. 08/095,331, filed Jul. 21, 1993, now U.S. Pat. No. 5,428,939, entitled "METHOD FOR CRIMPING A WRAPPER ABOUT A FLORAL GROUPING", Each of these patent applications and patents is hereby incorporated herein by reference.

FIELD OF INVENTION

This invention generally relates to sleeves, and more particularly, sleeves used to wrap flower pots containing floral groupings and/or mediums containing floral groupings, and methods of using same.

BRIEF DESCRIPTION OF THE DRAWINGS

FIG. 1 is a side view of a sleeve having a detaching element and bonding material and constructed in accordance with the present invention.

FIG. 2A is a top to bottom sectional view of the sleeve of FIG. 1.

FIG. 2B is a side to side sectional view of the sleeve of FIG. 1.

FIG. 3 is a side view of a version of the sleeve of Figure with a release material disposed adjacent the bonding material.

FIG. 4 is a sectional view of the sleeve of FIG. 3.

FIG. 5 is a sectional view of the sleeve of FIG. 1 but having a release material disposed upon the bonding material.

FIG. 6 is a sectional view of an alternate version of the sleeve of FIG. 1 wherein areas of bonding material are disposed upon portions of both inner surfaces of the sleeve.

FIG. 7 is a sectional view of an alternate version of the sleeve of FIG. 6 having a release material disposed between the two areas of bonding material.

FIG. 8 is a perspective view of the sleeve of FIG. 7.

FIG. 9 is an alternate version of the sleeve of FIG. 6 wherein release material is disposed upon the areas of bonding material.

FIG. 10 is a sectional view of a version of the sleeve having staggered areas of bonding material on the inner surfaces.

FIG. 11 is a sectional view of a version of the sleeve wherein the bonding material is disposed upon a portion of the surface of the gusset facing the inner surface of the sleeve.

FIG. 12 is a side view of another sleeve constructed in accordance with the present invention.

FIG. 13 is a top sectional view through a portion of the sleeve of FIG. 12.

FIG. 14 is a top sectional view of the sleeve of FIG. 12 having a release material disposed within the inner space thereof.

FIG. 15 is a side view of another sleeve constructed in accordance with the present invention wherein the bonding material has an alternate pattern.

FIG. 16A is a side view of another version of a sleeve constructed in accordance with the present invention wherein the sleeve has a closure bonding material disposed thereon.

FIG. 16B is a side sectional view of the sleeve of FIG. 16.

FIG. 20 is a side view of yet another sleeve constructed in accordance with the present invention.

FIG. 21 is a sectional view of the sleeve of FIG. 20.

FIG. 22 is a perspective view of the sleeve of FIG. 20 in an opened configuration and with the upper portion removed.

FIG. 23 is a side view of another sleeve constructed in accordance with the present invention.

FIG. 24 is a side view of another sleeve constructed in accordance with the present invention wherein the upper portion is constructed of a material different from the material of the lower portion.

FIG. 25 is another sleeve wherein the upper portion is connected to a portion of the lower portion and removable via a tear strip.

FIG. 32 is a side view of a sleeve having a tightening tab.

FIG. 33 is a side view of a sleeve having a pair of tightening tabs.

FIG. 34 is a perspective view of the sleeve of FIG. 33 tightened about a potted plant.

FIG. 35 is a side view of a sleeve having a pair of tab extensions with a bonding material disposed on the sleeve.

FIG. 36 is a perspective view of the sleeve of FIG. 35 tightened about a potted plant.

FIG. 37 is a sectional view of a sleeve such as the sleeve of FIG. 35 but having a release material disposed upon the bonding material.

FIG. 38 is a side view of a sleeve such as the sleeve of FIG. 35 but also having a bonding material on the tabs.

FIG. 39 is a perspective view of a sleeve forming apparatus showing a method of constructing a sleeve in accordance with the present invention.

FIG. 40 is a side view of a dual web roller feeding apparatus which can be used as an alternate method for feeding the webs shown in FIG. 39.

FIG. 41 is a plan view of an alternate sleeve-forming configuration.

FIG. 42 is a plan view of another sleeve-forming configuration.

FIG. 43 is a plan view of yet another sleeve-forming configuration.

FIG. 44 is a plan view of yet another sleeve-forming configuration.

DESCRIPTION OF THE PREFERRED EMBODIMENTS

Figure 17A:
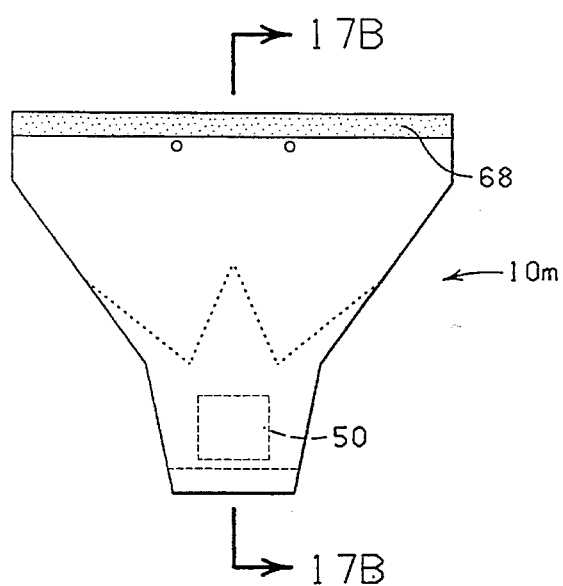
FIG. 17A is a side view of another sleeve having a closure bonding material disposed thereon.

The present invention contemplates a plant packaging system comprising a sleeve having a combination of an protective upper portion and a decorative lower portion having a base and skirt for packaging a potted plant. The upper sleeve can be detached from the decorative portion of the package system once the function of the upper sleeve has been completed, thereby exposing the decorative cover and allowing the skirt portion to extend outwardly from the base. The upper sleeve and decorative cover components may comprise a unitary construction or may comprise separate components which are attached together by various bonding materials.

More specifically, the present invention contemplates a plant cover for covering a pot means having an outer peripheral surface. The plant cover comprises (1) a base portion having a lower end, an upper end, and an outer peripheral surface, and having an opening extending from the upper end to the lower end, and (2) an upper sleeve portion extending from the upper end of the base portion and detachable therefrom, and wherein when the upper sleeve portion is detached from the upper end of the base portion, a portion of the base portion referred to as a skirt extends outwardly, upwardly or inwardly from the base. In general, the base portion is sized to substantially cover the outer peripheral surface of the pot means. The upper sleeve portion may be detachable via a detaching means such as perforations, tear strips and zippers. The plant cover may have an extended portion extending from the upper portion for serving as a handle or support device.

A preferred version of the invention is a flexible sleeve which comprises a flattened body having a closed lower end, an open upper end, an outer peripheral surface, and an inner peripheral surface surrounding an inner retaining space. The sleeve further comprises a lower portion having an inner retaining space for enclosing the pot, an upper portion connected to the lower portion and sized to substantially surround and encompass the floral grouping when the pot and floral grouping are disposed within the sleeve, the upper portion detachable from the lower portion via perforations positioned in a predetermined pattern, and a bonding material disposed upon a portion of the inner peripheral surface, the bonding material for bondingly connecting a portion of the sleeve to the pot when the sleeve is opened and the pot is disposed within the inner retaining space thereby holding the lower portion of the sleeve in a position about the pot and the upper portion of the sleeve in a position about the floral grouping.

The upper portion may be constructed from a first material and the lower portion from a second material different from the first material. The lower portion of the sleeve may comprise a skirt portion which extends from the base portion when the upper portion of the sleeve is detached. The sleeve may further comprise an extended portion of the upper portion for serving as a handle. The sleeve may further comprise a release material for preventing the bonding material from bondingly connecting to an opposing portion of the inner peripheral surface. A closure bonding material may be disposed upon the upper portion near the upper end for sealing the upper end of the sleeve for enclosing the floral grouping within the upper portion. The upper portion may further comprise apertures for enabling ventilation of the enclosed floral grouping.

The flattened body may be further defined as having a first side which has a first edge, a second edge, an upper edge, a lower edge, an outer surface and an inner surface, a second side which has a first edge, a second edge, an upper edge, a lower edge, an outer surface and an inner surface, and wherein in a flattened condition of the sleeve, the inner surface of the first side rests flatwise upon the inner surface of the second side and the first edge of the first side is sealed to the first edge of the second side and the second edge of the first side is sealed to the second edge of the second side.

In another embodiment, the sleeve may have a tab having a connected end and a free end wherein the connected end is connected to the outer peripheral surface of the lower portion of the sleeve, and further may have a bonding material for bondingly connecting the free end of the tab to a portion of the outer peripheral surface of the lower portion for tightening the lower portion of the sleeve about portion of a pot disposed within the sleeve for holding the sleeve in a position about the pot. The bonding material may be disposed upon the tab near the free end of the tab. Further, the bonding material may be disposed upon a portion of the outer peripheral surface of the lower portion of the flexible sleeve for receiving the free end of the tab. Alternatively, the bonding material may be disposed upon the tab near the free end of the tab and upon a portion of the outer peripheral surface of the lower portion of the flexible sleeve in a position to receive the free end of the tab when the tab is tightened. A removable release material may be disposed upon the bonding material.

In another version, the present invention comprises a method of packaging a potted plant, including the steps of, (1) providing a flexible sleeve in any of the versions described herein, (2) opening the flexible sleeve rendering accessible the inner retaining space of the sleeve, (3) providing a pot containing a floral grouping, the pot having an outer peripheral surface, (4) disposing the pot within the inner retaining space of the flexible sleeve wherein the lower portion of the flexible sleeve is positioned adjacent the pot and the upper portion of the sleeve extends upwardly from the pot, said upper portion substantially surrounding and encompassing the floral grouping, and the bonding material positioned adjacent a portion of the outer peripheral surface of the pot, and (5) urging the lower portion of the sleeve having the bonding material on the inner surface thereof against the outer surface of the pot thereby bondingly connecting the lower portion of the sleeve to the pot. The flexible sleeve may further comprise a release material for preventing the bonding material from bondingly connecting to an opposing portion of the inner peripheral surface of the flexible sleeve and wherein prior to the step of disposing the pot within the sleeve, the release material is removed from the sleeve. Alternatively, prior to the step of disposing the pot within the sleeve, the position of the release material may just be shifted within the inner retaining space for exposing the bonding material. The method may further comprise the step of sealing the upper end of the sleeve for enclosing the floral grouping within the upper portion of the sleeve.

The present invention in another version is a potted plant package, comprising a potted plant and a flexible sleeve as described herein, and wherein the potted plant is disposed within the inner retaining space of the flexible sleeve wherein a base portion of the lower portion of the flexible sleeve is positioned adjacent the pot and the upper portion of the sleeve extends upwardly from the pot, said upper portion substantially surrounding and encompassing the floral grouping, and the bonding material bondingly connecting the base portion to a portion of the outer peripheral surface of the pot for holding the base portion in a position about the pot and the upper portion in a position about the floral grouping.

The present invention further contemplates a method of preparing a potted plant package for sale. The method includes the steps of (1) providing a potted plant package such as one described herein comprising a potted plant contained within a flexible sleeve wherein the potted plant is disposed within the inner retaining space of the flexible sleeve wherein a base portion of the lower portion of the flexible sleeve is positioned adjacent the pot and the upper portion of the sleeve extends upwardly from the pot, said upper portion substantially surrounding and encompassing the floral grouping, and the bonding material bondingly connecting the base portion to a portion of the outer peripheral surface of the pot for holding the base portion in a position about the pot and the upper portion in a position about the floral grouping, and (2) removing the upper portion of the sleeve by tearing the upper portion away from the lower portion along the perforations, wherein the lower portion of the sleeve remains disposed about the pot, the lower portion of the sleeve forming a decorative plant cover which substantially surrounds and encompasses the pot and wherein the lower portion is bondingly connected to the pot and held thereto by the bonding material on the inner peripheral surface of the lower portion. The upper end of the sleeve of the potted plant package which is provided may be closed.

Further detail and explanation of the articles and methods of the present invention are forthcoming in the description provided below.

The Embodiments and Methods of Use of FIGS. 1–15

Shown in FIGS. 1 and 2A–2B and designated therein by the general reference numeral 10 is a flexible bag or sleeve of unitary construction. The sleeve 10 initially comprises a flexible flattened piece of material which is openable into the form of a tube or sleeve. The sleeve 10 may be tapered outwardly from the lower end toward a larger diameter at its upper end. In its flattened state the sleeve 10 may have an overall trapezoidal, modified trapezoidal or contoured (non-linear) shape, and when opened is generally substantially frusto-conical to coniform. It will be appreciated, however, that the sleeve 10 may comprise variations on the aforementioned shapes or may comprise significantly altered shapes such as square or rectangular, wherein the sleeve 10 when opened has a cylindrical form, as long as the sleeve 10 functions in accordance with the present invention in the manner described herein.

The sleeve 10 has an upper end 12, a lower end 14, an outer peripheral surface 16 and in its flattened state has a sealed first edge 18 and a sealed second edge 20 and a first side 22 and a second side 24. The sleeve 10 has an opening 25 at the upper end 12 and preferably has a closed bottom at the lower end 14. Preferably the lower end 14 is closed with a gusset 26 but it may be sealed along an edge. The first side 22 has a first inner peripheral surface 28 and the second side 24 has a second inner peripheral surface 30 which together, when the sleeve 10 is opened, define and encompass an inner retaining space 32 as shown in FIG. 2. When the lower end 14 of the sleeve 10 has a closed bottom, a portion of the lower end 14 may be inwardly folded to form one or more gussets, as noted above for permitting a circular bottom of an object such as a potted plant to be disposed into the inner retaining space 32 of the lower end 14 of the sleeve 10.

The sleeve 10 is generally frusto-conically shaped, but the sleeve 10 may be, by way of example but not by way of limitation, cylindrical, frusto-conical, a combination of both frusto-conical and cylindrical, or any other shape, as long as the sleeve 10 functions as described herein as noted above. Further, the sleeve may comprise any shape, whether geometric, non-geometric, asymmetrical and/or fanciful as long as it functions in accordance with the present invention. The sleeve 10 may also be equipped with drains or ventilation holes (not shown), or can be made from permeable or impermeable materials.

The material from which the sleeve 10 is constructed preferably has a thickness in a range from about 0.1 mils to about 30 mils, although in some cases the sleeve may be much thicker, especially when the sleeve is constructed from multiple layers. Often, the thickness of the sleeve 10 is in a range from about 0.5 mils to about 10 mils. Preferably, the sleeve 10 has a thickness in a range from about 1.0 mil to about 5 mils. More preferably, the sleeve 10 is constructed from material which is flexible, semi-rigid, rigid, or any combination thereof. The sleeve 10 may be constructed of a single layer of material or a plurality of layers of the same or different types of materials. Any thickness of the material may be utilized as long as the material functions in accordance with the present invention as described herein. The layers of material comprising the sleeve 10 may be connected together or laminated or may be separate layers. Such materials used to construct the sleeve 10 are described in U.S. Pat. No. 5,111,637 entitled "Method For Wrapping A Floral Grouping" issued to Weder et al., on May 12, 1992, which is hereby incorporated herein by reference. Any thickness of material may be utilized in accordance with the present invention as long as the sleeve 10 may be formed as described herein, and as long as the formed sleeve 10 may contain at least a portion of a pot or potted plant or a floral grouping, as described herein. Additionally, an insulating material such as bubble film, preferable as one of two or more layers, can be utilized in order to provide additional protection for the item, such as the floral grouping, contained therein.

In one embodiment, the sleeve 10 may be constructed from two polypropylene films. The material comprising the sleeve 10 may be connected together or laminated or may be separate layers. In an alternative embodiment, the sleeve 10 may be constructed from only one of the polypropylene films.

The sleeve 10 may also be constructed, in whole or in part, from a cling material, "Cling Wrap or Material" when used herein means any material which is capable of connecting to the sheet of material and/or itself upon contacting engagement during the wrapping process and is wrappable about an item whereby portions of the cling material contactingly engage and connect to other portions of another material, or, alternatively, itself, for generally securing the material wrapped about at least a portion of a pot. This connecting engagement is preferably temporary in that the material may be easily removed, i.e., the cling material "clings" to the pot.

The cling material is constructed and treated if necessary, from polyethylene such as Cling Wrap made by Glad®, First Brands Corporation, Danbury, Conn. The thickness of the cling material will, in part, depend upon the size of sleeve 10 and the size of the pot in the sleeve 10, i.e., generally, a larger pot may require a thicker and therefore stronger cling material. The cling material will range in thickness from less than about 0.1 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

The sleeve 10 is constructed from any suitable material that is capable of being formed into a sleeve and wrapped about a pot and a floral grouping disposed therein. Preferably, the material comprises paper (untreated or treated in any manner), cellophane, metal foil, polymer film, non-polymer film, fabric (woven or nonwoven or synthetic or natural), cardboard, fiber, cloth, burlap, or laminations or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The material comprising the sleeve 10 may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992 and which is hereby incorporated herein by reference.

In addition, the material may have various coloring, coatings, flocking and/or metallic finishes, or other decorative surface ornamentation applied separately or simultaneously or may be characterized totally or partially by pearlescent, translucent, transparent, iridescent, neon, or the like, qualities. Each of the above-named characteristics may occur alone or in combination and may be applied to the upper and/or lower surface of the material comprising the sleeve 10. Moreover, portions of the material used in constructing the sleeve 10 may vary in the combination of such characteristics. The material utilized for the sleeve 10 itself may be opaque, translucent, transparent, or partially clear or tinted transparent.

It will generally be desired to use the sleeve 10 as a covering for a potted plant such as is well known in the art. The term "pot" as used herein refers to any type of container used for holding a floral grouping or plant. Examples of pots, used in accordance with the present invention include, but not by way of limitation, clay pots, wooden pots, plastic pots, pots made from natural mud/or synthetic fibers, or any combination thereof. The pot is adapted to receive a floral grouping in the retaining space. The floral grouping may be disposed within the pot along with a suitable growing medium described in further detail below, or other retaining medium, such as a floral foam. It will also be understood that the floral grouping, and any appropriate growing medium or other retaining medium, may be disposed in the sleeve 10 without a pot.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping comprises a bloom or foliage portion and a stem portion. Further, the floral grouping may comprise a growing potted plant having a root portion (not shown) as well. However, it will be appreciated that the floral grouping may consist of only a single bloom or only foliage, or a botanical item (not shown), or a propagule (not shown). the term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

In accordance with the present invention, a bonding material is preferably disposed on a portion of the sleeve 10 to assist in holding the sleeve 10 to the pot having the floral grouping therein when such a pot is disposed within the sleeve 10 or to assist in closing the upper end of the sleeve 10 or adhering the sleeve 10 to the pot after the pot has been disposed therein, as will be discussed in further detail below.

It will be understood that the bonding material may be disposed as a strip or block on a surface of the sleeve 10 as is described in more detail herein. The bonding material may also be disposed upon either the first side 22, the second side 24, the first inner peripheral surface, or the second inner peripheral surface, of the sleeve 10, as well as upon the pot. Further, the bonding material may be disposed as spots of bonding material, or in any other geometric, non-geometric, asymmetric, or fanciful form and in any pattern including covering either the entire inner peripheral surface and/or outer peripheral surface of the sleeve 10 and/or the pot or pot cover.

The bonding material may be covered by a cover material or release strip which can be removed prior to the use of the sleeve, pot or pot cover. The bonding material can be applied by means known to those of ordinary skill in their art. One method for disposing a bonding material, in this case an adhesive, is described in U.S. Pat. No. 5,111,637 entitled "Method For Wrapping A Floral Grouping" issued to Weder et al., on May 12, 1992, which has been incorporated by reference above.

The term "bonding material or bonding means" when used herein means an adhesive, frequently a pressure sensitive adhesive, or a cohesive. When the bonding material is a cohesive, a similar cohesive material must be placed on the adjacent surface for bondingly contacting and bondingly engaging with the cohesive material. The term "bonding material or bonding means" also includes materials which are heat sealable and, in this instance, the adjacent portions of the material must be brought into contact and then heat must be applied to effect the seal. The term "bonding material or bonding means" also includes materials which are sonic sealable and vibratory sealable. The term "bonding material or bonding means" when used herein also means a heat sealing lacquer or hot melt material which may be applied to the material and, in this instance, heat, sound waves, or vibrations, also must be applied to effect the sealing.

The term "bonding material or bonding means" when used herein also means any type of material or thing which can be used to effect the bonding or connecting of the two adjacent portions of the material or sheet of material to effect the connection or bonding described herein. The term "bonding material or bonding means" may also include ties, labels, bands, ribbons, strings, tapes (including single or double-sided adhesive tapes), staples or combinations thereof which may be used in accordance with the present invention. Some of the bonding materials would secure the ends of the material while other bonding material may bind the circumference of a wrapper, or a sleeve, or, alternatively and/or in addition, the bonding materials would secure overlapping folds in the material and/or sleeve. Another way to secure the wrapping and/or sleeve is to heat seal the ends of the material to another portion of the material. One way to do this is to contact the ends with an iron of sufficient heat to heat seal the material.

Alternatively, a cold seal adhesive may be utilized as the bonding material or means. The cold seal adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the desired shape is reduced. A cold seal adhesive binds quickly and easily with minimal pressure, and such a seal is not readily releasable. This characteristic is different from, for example, a pressure sensitive adhesive.

The term "bonding material or bonding means" when used herein also means any heat or chemically shrinkable material, and static electrical or other electrical means, chemical welding means, magnetic means, mechanical or barb-type fastening means or clamps, curl-type characteristics of the film or materials incorporated in material which can cause the material to take on certain shapes, cling films, slots, grooves, shrinkable materials and bands, curl materials, springs and any type of welding method which may weld portions of the material to itself or to the pot, or to both the material itself and the pot and which functions in accordance with the present invention.

Certain versions of the sleeve 10 described herein may be used in conjunction with a preformed plant cover as explained in greater detail below.

As shown in FIG. 1, the sleeve 10 is demarcated into an upper portion 36 and a lower portion 38. The lower portion 38 of the sleeve 10 is generally sized to contain the potted plant. The upper portion 36 may optionally have apertures 39 near the upper end thereof for allowing the sleeve 10 to be supported by a support mechanism such as a pair of wickets (not shown) such as is known in the art. The upper portion 36 of the sleeve 10 is generally sized to substantially surround and encompass the floral grouping of the potted plant disposed within the lower portion 38 of the sleeve 10. The sleeve 10 is demarcated into the upper portion 36 and the lower portion 38 by a detaching element 40 for enabling the detachment of the upper portion 36 of the sleeve 10 from the lower portion 38 of the sleeve 10. In the version shown in FIG. 1, the detaching element 40 is a plurality of perforations which extend across the outer peripheral surface 16 of the sleeve 10 from the first edge 18 to the second edge 20.

The term "detaching element," or "detaching means" as used generally herein, means any element or means, or combination of elements, or features, such as, but not limited to, perforations, tear strips, tear starts, zippers, and any other devices or elements of this nature known in the art, or any combination thereof, which enable or facilitate the tearing away or detachment of one object from another. Therefore, while perforations are shown and described in detail herein, it will be understood that tear strips, zippers, or any other "detaching elements" known in the art, or any combinations thereof, could be substituted therefor and/or used therewith. The sleeve 10 may comprise drainage or ventilation holes in the upper or lower portions for allowing movement of gases or moisture to and away from the inner space of the sleeve (not shown).

In a preferred embodiment, as shown in FIGS. 1 and 2A–2B, the lower portion 38 of the sleeve 10 further comprises a base portion 42, and a skirt portion 44. The base portion 42 comprises that part of the lower portion 38 which, when the pot is placed into the lower portion 38, has an inner peripheral surface which is substantially adjacent to and surrounds the outer peripheral surface of the pot. The skirt portion 44 comprises that part of the lower portion 38 which extends beyond the upper rim of the pot and adjacent at least a portion of the floral grouping contained within the pot and which is left to freely extend straight from or at angle, inwardly or outwardly, from the base portion 42 when the upper portion of 36 of the sleeve 10 is detached from the lower portion 38 of the sleeve 10 by actuation of the detaching element 40. In the intact sleeve 10, the skirt portion 44 comprises an upper peripheral edge 46 generally congruent with the detaching element 40 which is connected to a lower peripheral edge 48 of the upper portion 36 of the sleeve 10 also congruent with the detaching element 40. In FIGS. 1 and 2, the upper peripheral edge 46 of the skirt portion 44 is congruent with a series of perforations which together comprise the detaching element 40.

The upper portion 36 of the sleeve 10 may also have an additional detaching element (not shown) such as a plurality of vertical perforations for facilitating removal of the upper portion 36 and which are disposed more or less vertically therein extending from the detaching element 40 to the upper end 12 of the sleeve 10. When the vertical detaching element is present the upper portion 36 of the sleeve 10 is separable from the lower portion 38 of the sleeve 10 by tearing the upper portion 36 along both the vertical perforations and along the detaching element 40, thereby separating the upper portion 36 from the lower portion 38 of the sleeve 10. The lower portion 38 of the sleeve 10 remains disposed as the base portion 42 about the pot and as the skirt portion 44 about the floral grouping which extends from the pot forming a decorative cover which substantially surrounds and encompasses the potted plant.

It will be understood that equipment and devices for forming standard floral sleeves are commercially available, and are well known to a person of ordinary skill in the art. A preferred method is discussed below.

As noted above, the sleeve 10 preferably has a closed lower end 14. When the lower end 14 is closed the lower end 14 may have one or more gussets 26 formed therein for allowing expansion of the lower end 14 when an object with a broad lower end such as a pot is disposed therein. In another version of the present invention the lower end 14 may be completely or partially open.

In the preferred version of the present invention, the sleeve 10 further comprises an area of bonding material 50 disposed upon a portion of the inner peripheral surface 28 of the base portion 42 of the sleeve 10. In another version of the present invention, the sleeve may be constructed without a bonding material thereon. In the case, the sleeve may be attached to the outer surface of the pot disposed therein by a bonding material applied to the outer surface of the pot. The area of bonding material 50, when present, functions to enable the inner peripheral surface 28, or a portion thereof, to be bondingly connected to the outer peripheral surface of the pot disposed therein causing the sleeve 10 to be bondingly connected to the pot.

The sleeve 10 in FIG. 2A is shown as partially opened, however, the sleeve 10 is generally provided to the operator in a substantially flattened condition and usually as one of a stack of sleeves. During the process of covering the pot, the sleeve 10 is opened, manually or automatically. In the flattened condition of the sleeve 10, the pot bonding material 50 may partially adhere to the opposite inner peripheral surface 30 of the sleeve 10. Obviously, it is desirable to avoid a situation in which the pot bonding material 50 is permanently or strongly bonded to the inner peripheral surface 30 of the sleeve 10 because this would make it difficult for the sleeve 10 to be manually or automatically opened for insertion of the pot. As a result, the pot bonding material 50 may be made of an adhesive composition which has a low degree of tackiness such that if the pot bonding material 50 does adhere to the inner peripheral surface 30 it can be easily separated from the surface 30 when the sleeve is opened up. Such adhesives with low tackiness are well known to those of ordinary skill in the art and are commercially available.

Alternatively, the pot bonding material 50 can be composed of a cohesive material. Since the cohesive is applied to only one of the inner peripheral surfaces (surface 28 as shown in FIG. 2A or 2B), the cohesive will not bond to the opposite surface (surface 30 in FIG. 2A or 2B) as long as there is no opposing cohesive material to which it can bond. In this version of the invention, in order for the inner peripheral surface 28 of the sleeve 10 to be bonded to a pot disposed therein, an area of cohesive material to which the pot bonding material 50 can cohere must be present on at least a portion of the outer surface of the pot (not shown). Once the pot is inserted into the sleeve, the areas of bonding material can be pressed together to bondingly connect the sleeve to the pot.

In yet another version of the present invention, shown in FIGS. 12–15 of U.S. Ser. No. 08/237,078 which is incorporated by reference herein, a bonding material is disposed on a portion of the outer peripheral surface of the base portion of the sleeve 10. After the pot is disposed in the retaining space of the base portion, the sleeve 10 is manually or automatically crimped about the outer peripheral surface of the pot in the vicinity of the bonding material thereby forming overlapping folds in the base portion which are bondingly connected together by the bonding material to add structural integrity to the base portion of the sleeve and to cooperate to hold the base portion in the shape of a pot cover or for causing the base portion of the sleeve 10 to engage the outer peripheral surface of the pot and be held firmly thereabout. The bonding material may be disposed on the sleeve 10 at a position below the upper rim of the pot or may be disposed at a position on the base portion of the sleeve 10 above the upper rim of the pot such that the overlapping folds crimpingly formed are located in a position generally above the upper rim of the pot.

A material can be disposed between the pot bonding material 50 and the inner peripheral surface 30 for preventing the adherence of the material 50 to the surface 30. Shown in FIGS. 3 and 4 is a sleeve 10a exactly like sleeve 10 except that a piece of release material 52 is disposed within the space 32 of the sleeve 10a wherein the release material 52 serves as a barrier between the pot bonding material 50 which is disposed on the inner peripheral surface 28 and the inner peripheral surface 30 thereby preventing the material 50 from bonding to the surface 30. The release material 52 is constructed of a material which will not adhere to the pot bonding material. Such release materials are well known to those of ordinary skill in the art and are available commercially.

During operation, when the sleeve 10a is opened in anticipation of disposing a pot therein, after opening, the release material 52 can be removed from the space 32 of the sleeve 10a prior to insertion of the pot therein. In yet another version of the invention, FIG. 5 shows a sleeve 10b having a pot bonding material 50 having a piece of release material 54 disposed directly thereon in a manner well known in the art. The release material 54 can be removed from the opened sleeve immediately before insertion of the pot.

Shown in FIG. 6 is a sleeve 10c exactly like sleeve 10 except that in addition to having a bonding material 50 disposed on inner peripheral surface 28, the sleeve 10c also has an opposing bonding material 50a disposed on the inner peripheral surface 30. The bonding materials 50 and 50a are constructed of a material having low tackiness so that in the event the bonding material 50 adheres to the bonding material 50a, the sleeve 10c can still be easily opened for insertion of a pot. FIG. 7 shows a sleeve 10d which is exactly the same as sleeve 10c except that a piece of release material 52 is inserted into the space 32 of the sleeve 10d in the same manner as that shown in FIG. 4 wherein the release material is disposed between the areas of bonding material 50 and 50a. FIG. 8 shows a perspective view of an opened sleeve 10d with the release material 52 still disposed therein.

FIG. 9 shows a sleeve 10e which is exactly the same as sleeve 10c FIG. 6 except that each area of pot bonding material 50 and 50a has a release material 54 and 54a disposed directly thereon, respectively, in a manner as discussed above for sleeve 10b.

FIG. 10 shows a sleeve 10f which is exactly like sleeve 10 except the sleeve 10f has a first area of pot bonding material 56 and a second area of pot bonding material 58 which are disposed on opposite inner peripheral surfaces 28 and 30, respectively, and which are disposed at staggered positions such that bonding material 56 is positioned lower than the bonding material 58.

FIG. 11 shows a sleeve 10g which is exactly the same as sleeve 10 except that the sleeve 10g has a pot bonding material 60 which is disposed on the inner bottom surface of the sleeve, for example, upon the portion of the sleeve 10g which forms the gusset 26 of the sleeve 10g. When the sleeve 10g is opened for insertion of a pot, the outer bottom surface of the pot is bondingly connected to the inner bottom of the sleeve 10g by the pot bonding material 60.

FIGS. 12 and 13 show a sleeve 10h constructed in accordance with the present invention which is exactly the same as sleeve 10 except for differences in the positioning of the pot bonding material disposed upon the inner surfaces 28 and 30 of the sleeve 10h. Sleeve 10h is shown as having four areas of bonding material 62a, 62b, 62c and 62d. The areas of bonding material 62a–62d are alternately positioned upon the inner surfaces 28 and 30 of the sleeve 10h as shown in FIG. 13 so that the bonding areas are staggered and so that if the sleeve 10h is flattened no area of bonding material will be pressed against another area of bonding material. The sleeve 10h can thus be more easily opened.

FIG. 14 shows a sleeve 10i which is exactly the same as sleeve 10h except that sleeve 10i has a piece of release material 52 inserted into the space 32 so that areas of bonding material 62a and 62c are separated from areas of bonding material 62b and 62d whereby the areas of bonding material 62a–d do not adhere to opposite inner surfaces of the sleeve.

Shown in FIG. 15 is a sleeve 10j which is exactly the same as sleeve 10h except that sleeve 10j has areas of bonding material 64a–d which substantially correspond to areas of bonding material 62a–d in sleeve 10h except that the areas of bonding material 64a–d have triangular instead of rectangular shapes. In fact, it will be apparent to one of ordinary skill in the art that the number of areas of bonding material of the inner peripheral surface and their shapes and arrangements on the sleeve can be varied. In another version of the invention, not shown, the bonding material may be positioned in a spiral pattern on the inner surface of the lower portion of the sleeve.

Embodiments of FIGS. 16A–17C

Shown in FIG. 16A and 16B is a sleeve constructed exactly the same as sleeve 10 except that a closure bonding material 68 is disposed upon a portion of the inner surface 30 (or alternatively, surface 28). After a pot has been disposed within the sleeve 10k, the upper ends of the sleeve 10k can be pressed together, causing the bonding material 68 to adhere to a portion of the inner surface 28 to effect closure of the upper end 12 of the sleeve 10k.

Figure 17B:
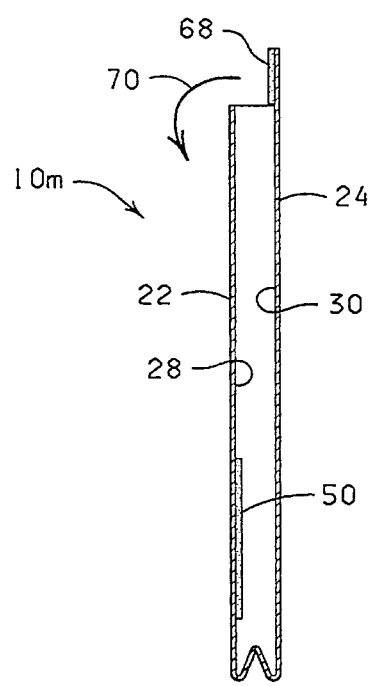
FIG. 17B is a side sectional view of the sleeve of FIG. 17A.

Shown in FIGS. 17A and 17B is a sleeve 10m which is an alternate version of the sleeve 10 in which the upper end of side 24 extends a distance beyond the upper end of side 22. Disposed upon the upper end of the inner peripheral surface 30 of side 24 is a closure bonding material 68. After a pot is disposed within the sleeve 10m, the upper end portion of side 24 with closure bonding material 68 disposed thereon can be folded in a direction 70 onto an upper end portion of side 22 thereby sealing the upper portion of the sleeve 10m.

Figure 17C:
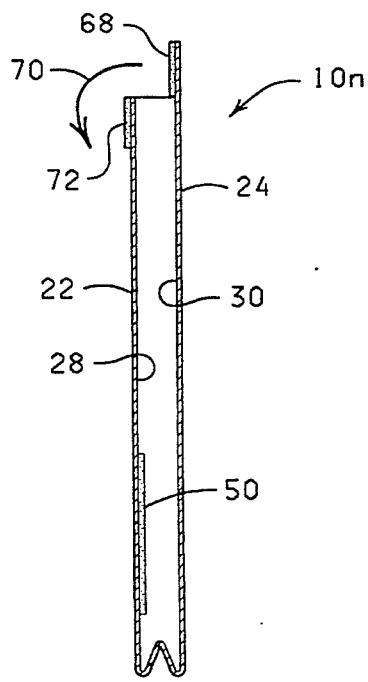
FIG. 17C is a side sectional view of a sleeve having a closure bonding material disposed on two areas of the sleeve.

Shown in FIG. 17C is a sleeve 10n which is exactly the same as sleeve 10m except there is a second closure bonding material 72 which is disposed upon an upper end portion of side 22. When the upper end portion of side 24 having the closure bonding material 68 is folded over onto side 22, the closure bonding material 68 bondingly engages closure bonding material 72 thereby effecting a seal in the upper end 12 of sleeve 10n. Preferably, in this version, the closure bonding materials 68 and 72 are both cohesive materials so that when another sleeve 10n is appressed against the sleeve, neither bonding material 68 nor 72 will cause the adjacent sleeves 10n to be connected to each other thereby facilitating the separation of sleeves 10n from the batch. It will be understood by one of ordinary skill in the art that the arrangements and types of closure bonding materials described in FIGS. 16A–17C are applicable to all other embodiments of sleeves described herein including sleeves with and without a pot bonding material.

Embodiments of FIGS. 18–25

Figure 18:
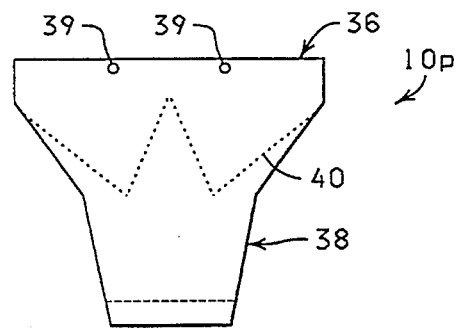
FIG. 18 is a side view of a version of the sleeve of the present invention having an upper portion extending only slightly above the uppermost portion of the lower portion.

Shown in FIG. 18 is a sleeve 10p which is exactly the same as sleeve 10 except that (1) it does not have a pot bonding material disposed upon a portion of the inner surface thereof and (2) the upper portion 36 is not sized so as to substantially encompass the floral grouping portion of a potted plant disposed therein. Rather, the upper portion 36, in this case performs the primary function of holding the lower portion 38 upon a support assembly, such as a wicket as described above. The upper portion 36 in this case is then intended to be removed before a potted plant is placed in the sleeve 10p.

Figure 19:
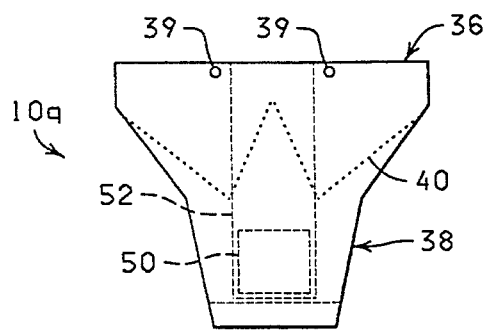
FIG. 19 is a side view of a sleeve like the sleeve in FIG. 18 yet having a bonding material on the inner surface thereof.
Figure 26:
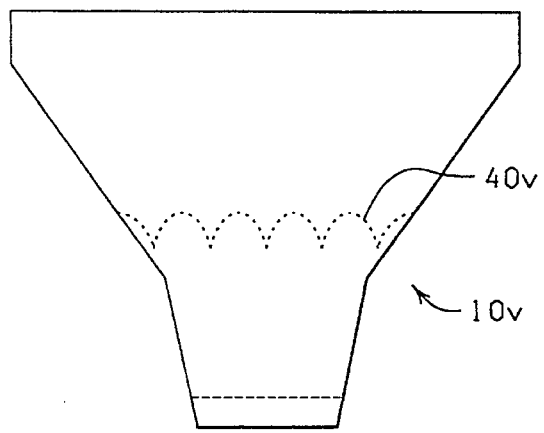
FIG. 26 is a side view of a version of a sleeve wherein the perforations have a scalloped pattern.

FIG. 19 shows a sleeve 10q which is exactly the same as sleeve 10p except that it has a pot bonding material 50 disposed therein for connecting to a pot disposed therein. Further, optionally, sleeve 10p may be equipped with a release material 52 which is attached to the upper portion 36 of the sleeve 10, or which extends to near the upper end of the upper portion 36 so that when the upper portion 36 is detached from the sleeve 10 during use of this version of the invention, the release material 52 is removed along with the upper portion 36 thereby eliminating the separate step of removing the release material 52 separately.

FIG. 20 shows a sleeve 10r which is exactly the same as sleeve 10p except the sleeve 10p has a gusset 26a which is constructed in a slightly different manner, as indicated in FIGS. 20 and 21. The sleeve 10r when opened, and after the upper portion 36 has been removed, is shown in FIG. 22. It will be appreciated that sleeve 10r may also have a pot bonding material disposed upon a portion of the inner surface thereof as described elsewhere herein.

FIG. 23 shows a sleeve 10s constructed exactly the same as the other sleeves described herein except that the sleeve 10s is formed from a tube of material which has been flattened and in which portions of the lower sleeve 38 have been removed to form a tapered lower portion 38 in the sleeve 10s. A gusset 26 may be formed in the lower end of the sleeve 10s or the sleeve may be left without a gusset in the lower end.

Shown in FIG. 24 is a sleeve 10t having an upper portion 36 and a lower portion 38, each of which are constructed of different materials (as indicated by the cross-hatching in the lower portion). Preferably, the upper portion 36 is constructed of a transparent material. The detaching element 40, for example, perforations, is disposed in the upper portion 36 of the sleeve 10t in a position slightly above the skirt portion 44 of the lower portion 38, wherein when the upper portion 36 is removed from the lower portion 38, if an uneven edge is left, the uneven edge comprises a portion of the transparent upper portion 36 of the sleeve 10t and is not obvious against the background of the floral grouping disposed within the sleeve 10t.

Shown in FIG. 25 is a sleeve 10u similar to sleeve 10t except that the upper portion 36 is removably attached to a portion of the lower portion 38 at a position below the skirt portion 44. The detaching element which serves to enable the separation of the upper portion 36 from the lower portion 38 is a tear strip 74 such as is well known by one of ordinary skill in the art. Each of sleeves 10t and 10u may of course have a pot bonding and/or closure bonding material disposed upon portions thereof as described elsewhere herein. The lower portion of the sleeves 10t and 10u may be preformed pot covers to which the upper sleeve portion is attached. The material of the upper portion of any of the sleeves described herein, included the sleeves of FIGS. 24 and 25 may be made of a material having a lighter, heavier, or equal gauge as the material of the lower portion.

Embodiments of FIGS. 26–31

Figure 27:
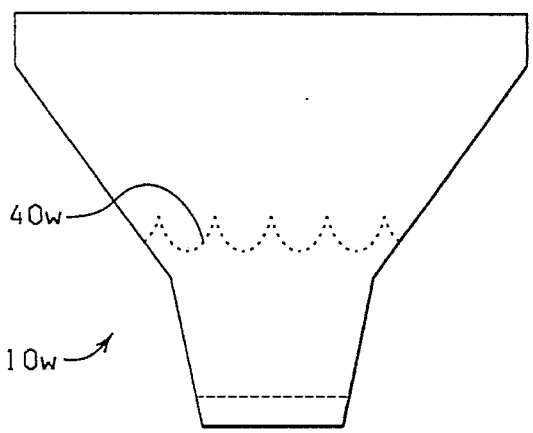
FIG. 27 is a side view of a version of a sleeve wherein the perforations have an inverted scalloped pattern.
Figure 28:
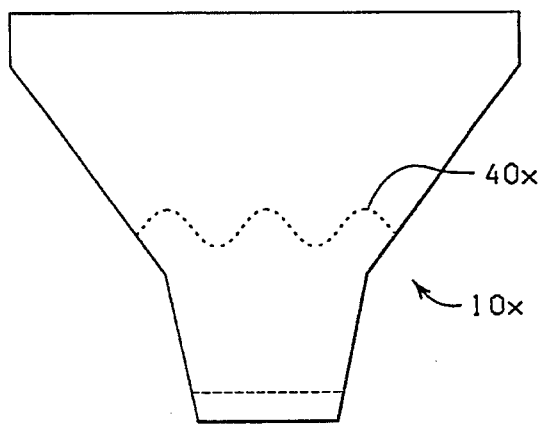
FIG. 28 is a side view of a version of a sleeve wherein the perforations have a wave pattern.
Figure 29:
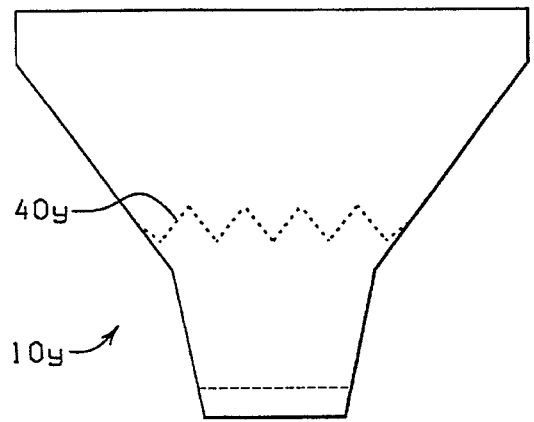
FIG. 29 is a side view of a version of a sleeve wherein the perforations have a zig-zag pattern.

Shown in FIGS. 26–31 are sleeves which are exactly like sleeve 10 except each has an alternative arrangement of perforations for enabling separation of the upper portion of a sleeve from the lower portion. Sleeve 10v in FIG. 26 has a detaching element 40v comprising perforations having a scalloped pattern. FIG. 27 shows a sleeve 10w which has a detaching element 40w comprising perforations having a upside-down, or inverted, scalloped pattern. FIG. 28 shows a sleeve 10x which has a detaching element 40 comprising perforations having a wavy or sine-wave type pattern. FIG. 29 shows a sleeve 10y which as a detaching element 40y having a toothed or zig-zag perforation pattern.

Figure 30:
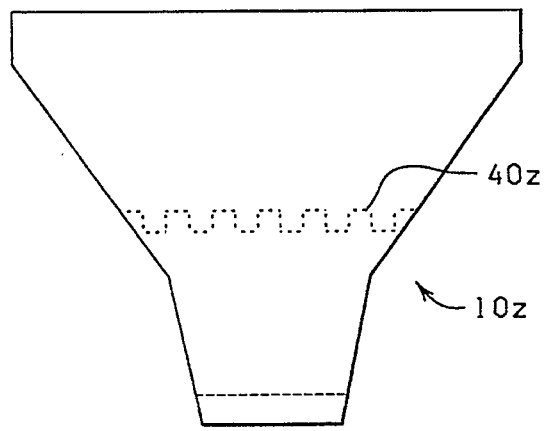
FIG. 30 is a side view of a version of a sleeve wherein the perforations have a rectangular pattern.
Figure 31:
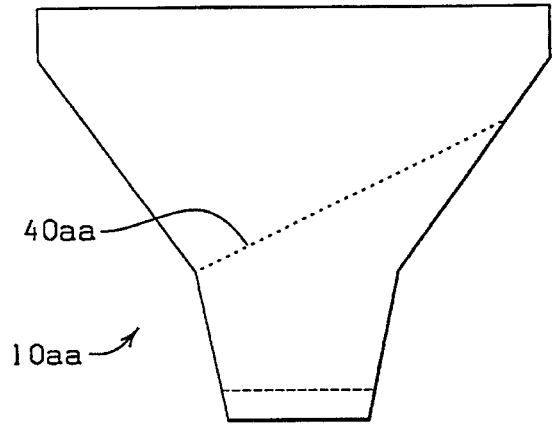
FIG. 31 is a side view of a version of a sleeve wherein the perforations are diagonally slanted.

FIG. 30 shows a sleeve 10z which has a detaching element 40z comprising perforations having a rectangular pattern. Shown in FIG. 31 is a sleeve 10aa having a detaching element 40aa which comprises perforations having a diagonally-oriented pattern. Each of these sleeves, as for the other sleeves described herein, may have a vertically-oriented line of perforations or other detaching element extending from the upper end of the sleeve to the other line of perforations for facilitating removal of the upper portion.

Embodiments of FIGS. 32–38

FIG. 32 shows a sleeve 10bb which is exactly like sleeve 10 except for the absence of a bonding material on the inner peripheral surface of the lower portion 38. Instead, sleeve 10bb comprises a tab 76 having a connected end 78 which is connected to a portion of the lower portion 38 and having a free end 80 which has a bonding material 82 disposed upon a portion thereof. The tab 76 functions to tighten the lower portion 38 about a pot disposed within the sleeve 10bb. FIG. 33 shows a sleeve 10cc which is exactly the same as sleeve 10bb except that it has a second tab designated as tab 84 having a connected end 86 which is connected to a portion of the lower portion 38 and having a free end 88 which has a bonding material disposed thereon. Both tabs 76 and 84 together function to enable the lower portion 38 of the sleeve 10cc to be tightened about a pot disposed within the sleeve 10cc such as is shown in FIG. 34 wherein tabs 76 and 84 and the bonding material 82 and 90 thereon are appressed against the outer peripheral surface of the sleeve 10cc to hold the sleeve 10cc about the external surface of the pot of the potted plant 92 disposed therein.

Another version of the present invention shown in FIG. 35 is sleeve 10dd which has a first tab 94 having a free end 96 and a second tab 98 having a free end 100. Disposed upon a portion of the outer peripheral surface 16 is a bonding material 102 positioned adjacent the tabs 94 and 98. The tabs 94 and 98 can be used to tighten the sleeve 10dd about a pot in substantially the same manner as shown in FIG. 34 except that the tabs 94 and 98 are attached to the sleeve 10dd by pressing the free ends 96 and 100 of the tabs 94 and 98 respectively, against the bonding material 102. This scenario is shown in FIG. 36.

FIG. 37 shows a cross-sectional view of a sleeve 10ee which is exactly the same as sleeve 10dd except a release material 104 is disposed over the bonding material 102 for preventing the bonding material 102 from inadvertently connecting to another object, such as another sleeve in a stack of sleeves. Shown in FIG. 38 is a sleeve 10ff having a bonding material 102 disposed upon a portion of the outer peripheral surface 16, a first tab 106 having a bonding material 108 thereon and a second tab 110 having a bonding material 112 thereon. In a preferred version of sleeve 10ff, the bonding materials 102, 108 and 112 are cohesive materials. Thus, when a pot is disposed within the sleeve 10ff the sleeve 10ff can be tightened about the pot by cinching the tab 106 and bondingly connecting bonding material 108 to bonding material 102 and cinching tab 110 and bondingly connecting bonding material 112 to bonding material 102 resulting in a sleeve appearing exactly the same as sleeve 10dd in FIG. 36 as discussed above. The advantage in the bonding materials 102, 108 and 112 being cohesive lies in the lack of bonding which will occur between sleeves 10ff when placed in a stack.

Construction of the Sleeves—FIGS. 39–44

It will be readily appreciated by those of ordinary skill in the art that processes for making standard floral sleeves which have open upper and lower ends are well known. In the preferred embodiment of the present invention, the sleeve is constructed with a closed bottom which may simply comprise a seal along the lower end of the sleeve or more preferably the closed bottom comprises an infolded portion such as a gusset which when opened enables expansion of the bottom of the sleeve for allowing insertion of a pot therein.

One version of the apparatus and process used to construct a sleeve as described herein is shown in FIG. 39. A single web of material 130 from a roll 131 is fed by drive means such as an electric motor (not shown) to a folding assembly 132 which causes the web 130 to fold and double up on itself to form a folded web 134 having an open side 136 and a folded side 138. The folded web 134 is supported upon a conveyor or other support surface 140. As the folded web 134 is advanced by drive rollers 141 or other advancing means in direction 142, the folded side 138 is caused in a continuous process to be infolded or pouched by an infolding device 144 forming a pouch 146 which extends the length of the web 134. The web 134 with the pouch 146 therein continues to be advanced in direction 142 to a sealing position 148. A sealing bar (not shown) such as is common in the art is then activated forming a pair of sealed edges 150 and 152. The sealed edges 150 and 152 extend from the pouch 146 to the open side 136 and form a sealed bottom or gusset 154.

The web 134, now having a sleeve outlined by the sealed edges 150 and 152, is further advanced to a perforating position 155 where perforations 156 are punched into the sleeve and optionally support apertures 158 are also punched into the sleeve for enabling a collection of sleeves to be collected in a stack and held on a support mechanism such as a wicket. Ventilation holes may also be punched into the sleeve at this point. In the next step the sleeve, now with sealed edges 150 and 152 and with perforations 156, is advanced to a cutting position 159 where the sleeve is cut by a cutting die or blade (not shown), which is well known in the art, from the web 134 to form a completed sleeve 160. Excess material 162 may be removed to facilitate removal and storage of the sleeve 160. It will be understood by one of ordinary skill in the art that the steps of sealing, perforating and cutting the sleeves may be performed together in a single step, or two steps at one or two positions.

The process outlined above describes the construction of a sleeve 160 without a bonding material disposed upon any portion thereof. However, as explained above, in a preferred version of the invention, a bonding material for bonding a portion of the sleeve to a pot is located on a portion of the inner surface of the sleeve. Shown in FIG. 39 is a bonding material applicator 164 such as a sprayer or pad applicator which can be used to apply an area of bonding material 166 to a portion of the inner surface of a sleeve. The bonding material applicator 164 may be reciprocatingly activated by a reciprocating assembly (now shown) which is preferably automatically controlled and construction of which is well within the level of ordinary skill in the art. The bonding material 166 is preferably applied to the web 130 prior to the doubling over of the web 130 so that when the web 130 is doubled over to form the folded web 134, the bonding material 166 is oriented on a portion of the inner surface of the sleeve 160, preferably in the lower portion of the sleeve 160. The result is the production of a sleeve like sleeve 10 in FIG. 2.

The process described herein can be modified to produce sleeves such as any of the other sleeves described elsewhere herein. For example, a sleeve such as sleeve 10a in FIG. 3 can be produced by inserting a piece of release material 52 into the sleeve 10a at some point during the sleeve production process, either manually or automatically, for example, after the bonding material 166 has been applied but before the web 130 has been folded over to form the folded web 134. The piece of release material 52 may be inserted manually by hand or automatically using a device which automatically shoots or blows or deposits such pieces of material and which is well within the skill of one of ordinary skill in the art. Alternatively, the release material may be applied directly upon the bonding material 166 when the bonding material 166 is applied to the web 130, ultimately resulting in a sleeve such as sleeve 10b shown in FIG. 5. An additional area of bonding material may be applied to another portion of the web with another adhesive applicator (not shown) thereby forming sleeves such as the sleeves shown in FIGS. 6–10, 13, 14 and 16A–17C.

FIG. 39 shows both edges of open side 136 of the web 134 as being an equal distance from the folded side 138. It will be understood by one of ordinary skill in the art that the two edges which comprise the open side 136 of the web 134 can be offset during the folding process to form a sleeve such as sleeve 10m or 10n in FIGS. 17A and 17B having an upper end flap which can be folded over to close the upper end of the sleeve.

FIG. 39 shows a sleeve-forming process in which a single web is doubled over no form the double-layered web. The sleeve formed as described herein may also be formed during a process using two or more separate webs as shown in FIG. 40. FIG. 40 shows a first roll of material 170 and a second roll of material 172 from which are unrolled a first web of material 174 and a second web of material 176, respectively. These webs 174 and 176 are fed in direction 178 to a position where one side of the two webs 174 and 176 are sealed by a sealing assembly 180. If a gusset in the finished sleeve is desired, the sealed side can be infolded to form a pouched side as described in the process of FIG. 39. The remainder of the operation can be formed as described above for the process of FIG. 39.

Sleeves formed in accordance with the present invention can also be formed from tubular materials such as are commercially available. For example, a sleeve such as sleeve 10s in FIG. 23 can be formed by cutting a portion of a tube, forming a gusset in the lower end of the tube, or sealing the lower end of the tube to form a closed bottom, then sealing and cutting off portions of the lower end of the tube forming a sleeve having a tapered lower end. Adhesive may be applied to an interior portion of the sleeve by opening the tube and spraying a bonding material onto a portion of the inner surface of the sleeve, for example. In another version of the invention, the process of forming the tubular material from one or more flat webs of material may comprise a step in the process of forming a sleeve.

FIGS. 41–44 show other configurations of sleeves having sealed lower ends which can be formed. Shown in FIG. 41 is a process in which both sides 184 and 186 of the webs are sealed and sleeves 188 formed in the web are positioned in an alternating upward and downward orientation to maximize usage of the web material. The sleeve 10gg formed in this method, when severed from the web has an upper gusset 190 in the upper end and a lower gusset 192 and in the lower end of the sleeve and thus is initially closed at both the upper and lower ends. Therefore, after severing the sleeve 10*gg* from the web, the upper gusset 190 of the sleeve must be cut away from the sleeve 10*gg* to form an open end in the sleeve 10*gg*. This may be done, for example, after the sleeves have been stacked to save time. FIG. 42 shows another version of a sleeve 10*hh* having a different shape, formed in a manner similar to that for FIG. 41 wherein upper and lower gussets are formed during the sleeve forming process. FIGS. 43 and 44 show alternate versions of sleeves 10*ii* and 10*jj*, respectively, which may be formed in accordance with the present invention, wherein the lower end 194 and 196, respectively, of the sleeves shown in FIGS. 43 and 44 are heat sealed but not gussetted. It will be appreciated that all of the sleeves described in FIGS. 41–44 may comprise any of the sleeve embodiments discussed elsewhere herein. For example, perforations 200 are shown in sleeve 10*jj*.

Changes may be made in the construction and the operation of the various components, elements and assemblies described herein or in the steps or the sequence of steps of the methods described herein without departing from the spirit and scope of the invention as defined in the following claims.

What is claimed is:

1. A method of packaging a potted plant, comprising:
   providing a flexible sleeve, the flexible sleeve having a closed lower end, an upper end, an outer peripheral surface, and an inner peripheral surface surrounding an inner retaining space, the sleeve further comprising:
      a lower portion having a space for enclosing a pot,
      an upper portion connected to the lower portion and sized to substantially surround and encompass a floral grouping, the upper portion detachable from the lower portion via perforations positioned in a predetermined pattern, and
      holding means comprising an adhesive bonding material;
   opening the flexible sleeve rendering accessible the inner retaining space of the sleeve; and
      providing a pot containing a floral grouping, the pot having an outer peripheral surface; and
      disposing the pot within the inner retaining space of the flexible sleeve wherein the lower portion of the flexible sleeve is positioned adjacent the pot and the upper portion of the sleeve extends upwardly from the pot, said upper portion substantially surrounding and encompassing the floral grouping, and the holding means positioned adjacent a portion of the outer peripheral surface of the pot, the holding means holding the lower portion of the sleeve in a position about the pot.

2. The method of clam 1 wherein in the step of providing the flexible sleeve, the flexible sleeve comprises a flattened body comprising:
   a first side having a first edge, a second edge, an upper edge, a lower edge, an outer surface and an inner surface;
   a second side having a first edge, a second edge, an upper edge, a lower edge, an outer surface and an inner surface;
   and wherein in flattened condition of the sleeve, the inner surface of the first side resets flatwise upon the inner surface of the second side and the first edge of the first side is sealed to the first edge of the second side and the second edge of the first side is sealed to the second edge of the second side.

3. The method of claim 1 wherein in the step of providing a the flexible sleeve, the flexible sleeve further comprises a closure bonding material near the upper end thereof and the method further comprising the step of sealing the upper end of the sleeve with the closure bonding material for enclosing the floral grouping within the upper portion of the sleeve.

4. The method of claim 1 wherein in the step of providing the sleeve, the adhesive bonding material of the holding means is disposed upon a portion of the inner peripheral surface of the sleeve and wherein in the disposing step the lower portion of the sleeve having the bonding material on the inner surface thereof is urged against the outer surface of the pot thereby bondingly connecting the lower portion of the sleeve to the pot.

5. The method of claim 4 wherein in the step of providing the flexible sleeve, the flexible sleeve further comprises a release material for preventing the bonding material from bondingly connecting to an opposing portion of the inner peripheral surface of the flexible sleeve and wherein prior to the step of disposing the pot within the sleeve, the release material is removed from the sleeve.

6. The method of claim 4 wherein in the step of providing the flexible sleeve, the flexible sleeve further comprises a release material for preventing the bonding material from bondingly connecting to an opposing portion of the inner peripheral surface of the flexible sleeve and wherein prior to the step of disposing the pot within the sleeve, the position of the release material is shifted within the inner retaining space for exposing the bonding material.

7. The method of claim 4 wherein the inner peripheral surface comprises a first inner surface and a second inner surface and wherein the bonding material is disposed upon portions of both the first and second inner surfaces.

8. The method of claim 7 wherein the bonding material on the first inner surface is offset in relation to the bonding material on the second inner surface for enhancing the ease with which the flexible sleeve is opened during the disposing step.

9. The method of claim 4 wherein the inner peripheral surface further comprises an inner bottom surface on the closed lower end and wherein the bonding material is disposed upon said inner bottom surface and wherein in the disposing step the pot is bondingly connected to the inner bottom surface of the sleeve.

10. The method of claim 1 wherein in the step of providing the sleeve, the holding means further comprises a tab having a connected end connected to a portion of the sleeve and a free end, the free end connectable to a portion of the outer peripheral surface of the sleeve via the adhesive bonding material and wherein after the pot is disposed within the sleeve, the free end of the tab is bondingly connected to a portion of the outer peripheral surface of the sleeve for holding the lower portion of the sleeve about the pot.

11. The method of claim 10 wherein the adhesive bonding material is disposed upon the tab near the free end of the tab.

12. The method of claim 10 wherein the adhesive bonding material is disposed upon a portion of the outer peripheral surface of the lower portion of the flexible sleeve for receiving the free end of the tab.

13. The method of claim 10 wherein the adhesive bonding material is disposed upon the tab near the free end of the tab and upon a portion of the outer peripheral surface of the lower portion of the flexible sleeve in a position to receive the free end of the tab when the tab is bondingly connected to the sleeve.

14. The method of claim 10 wherein a removable release material is disposed upon the bonding material and removed prior to the step of connecting the tab to the sleeve.

15. The method of claim 1 wherein in the step of providing the flexible sleeve, the lower portion of the sleeve further comprises a skirt portion which extends from the base portion when the upper portion of the sleeve is detached.

16. A method of preparing a potted plant package for sale, comprising:

provided a potted plant package comprising:

a pot containing a floral grouping, the pot having an outer peripheral surface, and a flexible sleeve having a closed lower end, an upper end, an outer peripheral surface, and an inner peripheral surface surrounding an inner retaining space, the sleeve further comprising:

a lower portion having a space for enclosing the pot, an upper portion connected to the lower portion and sized to substantially surround and encompass the floral grouping, the upper portion detachable from the lower portion via perforations positioned in a predetermined pattern, and holding means comprising an adhesive bonding material, and wherein the potted plant is disposed within the inner retaining space of the flexible sleeve wherein a base portion of the lower portion of the flexible sleeve is positioned adjacent the pot and the upper portion of the sleeve extends upwardly from the pot, said upper portion surrounding the floral grouping, and the holding means for holding the base portion in a position about the pot and the upper portion in a position about the floral grouping; and removing the upper portion of the sleeve by tearing the upper portion away from the lower portion along the perforations, wherein the lower portion of the sleeve remains disposed about the pot, the lower portion of the sleeve forming a decorative plant cover which substantially surrounds and encompasses the pot and wherein the lower portion is held thereto by the holding means.

17. The method of claim 16 wherein the step of providing a potted plant package, the upper end of the sleeve is closed.

18. The method of claim 16 wherein the step of removing the upper portion of the sleeve, the lower portion of the sleeve has a skirt portion which is exposed and extends outwardly from the base portion of the lower portion once the upper portion of the sleeve is detached.

19. The method of claim 16 wherein in the step of providing the potted plant package, the adhesive bonding material of the holding means is disposed upon a portion of the inner peripheral surface of the sleeve which bondingly connects the lower portion of the sleeve to the pot.

20. The method of claim 19 wherein the inner peripheral surface comprises a first inner surface and a second inner surface and wherein the bonding material is disposed upon portions of both the first and second inner surfaces.

21. The method of claim 20 wherein the bonding material on the first inner surface is offset in relation to the bonding material on the second inner surface.

22. The method of claim 19 wherein the inner peripheral surface further comprises an inner bottom surface on the closed lower end and wherein the bonding material is disposed upon said inner bottom surface and wherein in the pot is bondingly connected to the inner bottom surface of the sleeve.

23. The method of claim 16 wherein in the step of providing the potted plant package, the holding means further comprises a tab having a connected end connected to a portion of the sleeve and a free end, the free end connected to a portion of the outer peripheral surface of the sleeve via the adhesive bonding material for holding the lower portion of the sleeve about the pot.

24. The method of claim 23 wherein the adhesive bonding material is disposed upon the tab near the free end of the tab.

25. The method of claim 23 wherein the adhesive bonding material is disposed upon a portion of the outer peripheral surface of the lower portion of the flexible sleeve for connecting the free end of the tab to the sleeve.

26. The method of claim 23 wherein the adhesive bonding material is disposed upon the tab near the free end of the tab and upon a portion of the outer peripheral surface of the lower portion of the flexible sleeve in a position for connecting the free end of the tab to the sleeve.

* * * * *

UNITED STATES PATENT AND TRADEMARK OFFICE
CERTIFICATE OF CORRECTION

PATENT NO. : 5,572,849
DATED : November 12, 1996
INVENTOR(S) : Weder et al.

It is certified that error appears in the above-indentified patent and that said Letters Patent is hereby corrected as shown below: On the title page:Item [56]

Page 2, line 26, OTHER PUBLICATIONS, please delete "Reynols" and substitute therefor --Reynolds--.

Column 1, line 9, please delete "1995 now" and substitute therefor --1995 which now--.

Column 2, line 10, please insert "1" after Figure.

Column 18, line 34, please delete "no" and substitute therefor --to--.

Column 20, line 2, please delete "a the flexible" and substitute therefor --the flexible--.

Signed and Sealed this

First Day of April, 1997

Attest:

BRUCE LEHMAN

*Attesting Officer*   Commissioner of Patents and Trademarks